United States Patent
Hasegawa et al.

(10) Patent No.: US 10,693,273 B2
(45) Date of Patent: Jun. 23, 2020

(54) REFLECTOR, FIBER CAVITY, AND FIBER LASER

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP); TOYOTA SCHOOL FOUNDATION, Nagoya-shi, Aichi-ken (JP)

(72) Inventors: Kazuo Hasegawa, Nagakute (JP); Satoru Kato, Nagakute (JP); Tomoya Okazaki, Nagoya (JP); Kazuya Saito, Nagoya (JP)

(73) Assignees: KABUSHIKI KAISHA TOYOTA CHUO KENKYUSHO, Nagakute (JP); TOYOTA JIDOSHA KABUSHIKI KAISHA, Toyota (JP); TOYOTA SCHOOL FOUNDATION, Nagoya (JP)

( * ) Notice: Subject to any disclaimer, the term of this patent is extended or adjusted under 35 U.S.C. 154(b) by 0 days.

(21) Appl. No.: 16/123,721

(22) Filed: Sep. 6, 2018

(65) Prior Publication Data
US 2019/0089112 A1    Mar. 21, 2019

(30) Foreign Application Priority Data

Sep. 20, 2017    (JP) .................... 2017-179758

(51) Int. Cl.
*H01S 3/067*    (2006.01)
*H01S 3/094*    (2006.01)
(Continued)

(52) U.S. Cl.
CPC ........ *H01S 3/0675* (2013.01); *H01S 3/06733* (2013.01); *H01S 3/0941* (2013.01);
(Continued)

(58) Field of Classification Search
CPC .................... H01S 3/0675; H01S 3/094007
See application file for complete search history.

(56) References Cited

U.S. PATENT DOCUMENTS

2014/0341238 A1* 11/2014 Kitabayashi .......... H01S 3/0675
372/6

OTHER PUBLICATIONS

Mihailov et al."Fiber Bragg gratings made with a phase mask and 800-nm femtosecond radiation," Jun. 15, 2003, vol. 28, No. 12, pp. 995-997. (Year: 2003).*

(Continued)

*Primary Examiner* — Michael Carter
(74) *Attorney, Agent, or Firm* — Oliff PLC (57) ABSTRACT

A reflector includes a gain fiber and a periodic refraction structure unit. The gain fiber has a core doped with a rare earth element. The periodic refraction structure unit includes a high-refractive-index region that has a predetermined width, that is formed at a predetermined spacing along an optical axis direction of the gain fiber, that is formed across an entire section of the core that is orthogonal to the optical axis of the core, and that has a first refractive index, and a low-refractive-index region that is formed adjacent to the high-refractive-index region, that has a width equal to the predetermined spacing, and that has a second refractive index lower than the first refractive index. A width $d_i$ of an $i^{th}$ periodic structure of refractive index in the periodic refraction structure unit is given by the equation $d_i = H_i \cdot (\lambda/(2 \cdot n_i)) + \lambda/(4 \cdot n_i)$.

5 Claims, 5 Drawing Sheets

(51) Int. Cl.
   *H01S 3/0941*   (2006.01)
   *H01S 3/08*     (2006.01)
   *G02B 6/02*     (2006.01)
   *H01S 3/16*     (2006.01)

(52) U.S. Cl.
   CPC ...... *H01S 3/094003* (2013.01); *G02B 6/0208* (2013.01); *G02B 6/02147* (2013.01); *H01S 3/0804* (2013.01); *H01S 3/09415* (2013.01); *H01S 3/094007* (2013.01); *H01S 3/1618* (2013.01)

(56) References Cited

OTHER PUBLICATIONS

Jovanovic et al.; "Narrow linewidth, 100 W cw Yb3+-doped silica fiber laser with a point-by-point Bragg grating inscribed directly into the active core;" Optics Letters; 2007; pp. 2804-2806; vol. 32, No. 19.

\* cited by examiner

REFLECTOR, FIBER CAVITY, AND FIBER LASER

CROSS-REFERENCE TO RELATED APPLICATION

This application claims priority under 35 USC 119 from Japanese Patent application No. 2017-179758 filed on Sep. 20, 2017, the disclosure of which is incorporated herein by reference in its entirety.

BACKGROUND

Technical Field

The present disclosure relates to a reflector, a fiber cavity, and a fiber laser.

Related Art

Figure 5:
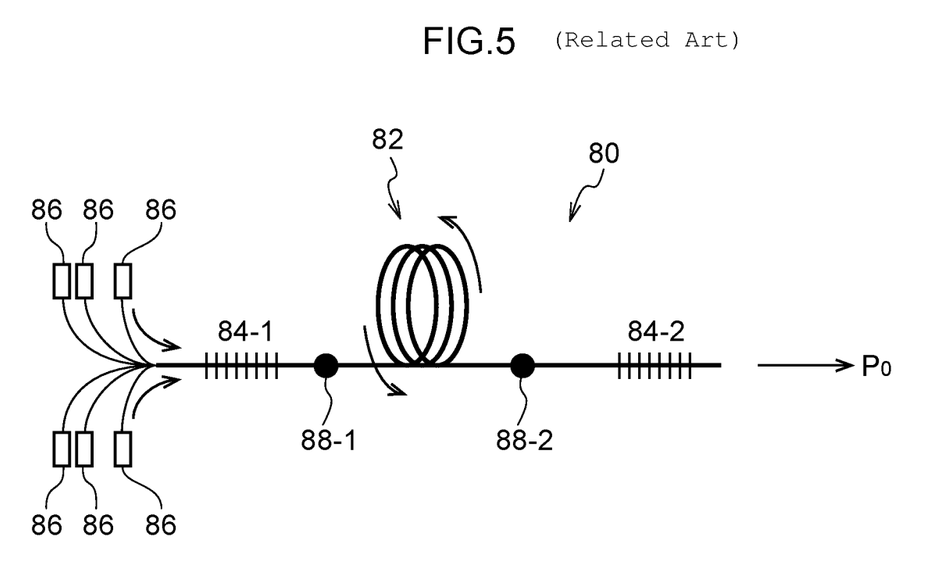
FIG. 5 is a schematic diagram illustrating a configuration of a fiber laser according to a comparative example.

A fiber laser including a reflector and a fiber cavity will first be explained with reference to FIG. 5. FIG. 5 illustrates a fiber laser 80 according to a comparative example. The fiber laser 80 is an external-cavity laser oscillator.

As illustrated in FIG. 5, the fiber laser 80 is configured including an active fiber 82, reflectors 84-1, 84-2 (collectively referred to as reflectors 84), plural semiconductor lasers (laser diodes: LD) 86, and splice sections 88-1, 88-2 (collectively referred to as splice sections 88).

The reflectors 84 are configured by fiber Bragg gratings (FBG) formed in an optical fiber. A FBG is produced by illuminating ultraviolet laser light on an optical fiber so as so modulate the refractive index of (form a diffraction grating in) the core of the optical fiber. The reflectors 84 reflect light due to the effect of the diffraction gratings, and in the fiber laser 80, the reflector 84-1 is a high-reflectivity FBG (HR-FBG) and the reflector 84-2 is a low-reflectivity FBG (LR-FBG). The reflectors 84-1 and 84-2 together configure the optical cavity for obtaining lasing.

The active fiber 82 is fiber with gain, and may also be referred to as a gain fiber. An active fiber 82 that has been doped with ytterbium (Yb) is, for example, employed in the fiber laser 80. The semiconductor lasers 86 are light sources for pumping the active fiber 82. Light output from the plural semiconductor lasers 86 is combined by a non-illustrated combiner and input to the reflector 84-1. "Splice sections" generally refer to sections where two optical fibers are fused together. A fiber including the reflector 84-1 is fused to the active fiber 82 at the splice section 88-1, and a fiber including the reflector 84-2 is fused to the active fiber 82 at the splice section 88-2.

In the fiber laser 80, the active fiber 82 is pumped with pump light from the semiconductor lasers 86. The pumped light causes light in the optical cavity configured by the reflectors 84-1 and 84-2 to resonate in a state of high energy density, and laser light is emitted from the low-reflectivity reflector 84-2 as output light Po.

There are two types of active fibers (gain fibers): single-mode and multi-mode. Single-mode active fibers are used in comparatively low output fiber lasers, and multi-mode active fibers are used in comparatively high output fiber lasers. Further, with respect to the method by which pump light is propagated, there are single-clad fibers and double-clad fibers. Single-clad fibers have a single layer of cladding and are employed in comparatively low output applications. Double-clad fibers have two layers of cladding and are employed in comparatively high output applications. Both single-clad fibers and double-clad fibers are categorized as being single-mode or multi-mode according to the mode(s) of light propagating through.

As mentioned above, a FBG is produced by illuminating light on an optical fiber such that high-refractive-index portions and low-refractive-index portions are alternatingly formed. Several manufacturing methods to form an FBG in an optical fiber are a known. For example, in "Narrow linewidth, 100 W cw Yb 3+-doped silica fiber laser with a point-by-point Bragg grating inscribed directly into the activecore" (N. Jovanovic, M. Aslund, A. Fuerbach, S. D. Jackson, G D. Marshall, and M. J. Withford, Optics letters 32 (19), 2804-2806 (2007)), a point-by-point technique is used to form a FBG in the core of a single-mode optical fiber.

Generally, when laser light is illuminated on a material that is transparent to some wavelength of laser light, laser light at that wavelength is not absorbed by the material, and so the material is not able to be processed thereby. However, when laser light with a very large peak value such as in ultrashort pulse light is illuminated thereon, due to a non-linear phenomenon known as multiphoton absorption, light is absorbed by the material and processing becomes possible. Namely, in "Narrow linewidth, 100 W cw Yb 3+-doped silica fiber laser with a point-by-point Bragg grating inscribed directly into the activecore" (N. Jovanovic, M. Aslund, A. Fuerbach, S. D. Jackson, G D. Marshall, and M. J. Withford, Optics letters 32 (19), 2804-2806 (2007)), an effect known as reforming, caused by controlling radiant energy density, is employed to produce a FBG by moving a focused beam in steps along the length direction of the core of a single-mode optical fiber that has been doped with a rare earth element in a point-by-point process.

As described above, the fiber laser 80 according to the comparative example includes the splice sections 88 where the reflectors 84 (optical fibers formed with FBGs) are fused to the active fiber 82. However, light leakage may occur at the splice sections 88, resulting in loss. In particular, in fiber lasers employed in high output applications, such light leakage may cause optical fibers to melt or ignite.

Further, if there are points of loss like the splice sections 88 in the optical cavity configured by the reflectors 84-1, 84-2, the lasing threshold may rise and slope efficiency may be reduced. Moreover, if the wavelength of pump light or laser output light is reduced (for example, shifted from a red-band laser to a blue-band laser), there is concern that fluctuation in the refractive index of a FBG produced using a fiber doped with germanium dioxide ($GeO_2$) occurs, as a result of the shorter wavelength light.

In short, to increase the optical output of a fiber laser and moreover raise the reliability thereof, it is necessary to use a multi-mode fiber with a comparatively large core diameter and to eliminate any splice sections (fused points). Moreover, in order to configure an efficient optical cavity, the reflection characteristics (e.g., reflected wavelength) of the reflectors (FBGs) need to be precisely set.

Regarding this point, the method of FBG manufacture disclosed in "Narrow linewidth, 100 W cw Yb 3+-doped silica fiber laser with a point-by-point Bragg grating inscribed directly into the activecore" (N. Jovanovic, M. Aslund, A. Fuerbach, S. D. Jackson, G D. Marshall, and M. J. Withford, Optics letters 32 (19), 2804-2806 (2007)) only relates to producing a FBG by illuminating light on a single point in the core of a single-mode optical fiber at a time in its point-by-point process so as to form the FBG from discrete points, and thus is not easily applied to multi-mode optical fibers with a comparatively large core diameter.

Moreover, the size of high-refractive-index regions formed by illuminating light on one point at a time in a point-by-point process may vary, and there may be gaps between the high-refractive-index regions and the core. Such gaps may cause losses similar to that at the splice sections 88 described above, resulting in issues such as melting of the optical fiber.

SUMMARY

The present disclosure provides a reflector, a fiber cavity, and a fiber laser for which reflected wavelength characteristics can be precisely set, that have high reliability, and that are able to accommodate shorter wavelengths.

In a first aspect of the present disclosure, a reflector includes a gain fiber and a periodic refraction structure unit. The gain fiber has a core doped with a rare earth element. The periodic refraction structure unit includes one or more high-refractive-index region that has a predetermined width, that is formed at a predetermined spacing along an optical axis direction of the gain fiber, that is formed across an entire section of the core that is orthogonal to the optical axis of the core, and that has a first refractive index, and one or more low-refractive-index region that is formed adjacent to the one or more high-refractive-index region, that has a width equal to the predetermined spacing, and that has a second refractive index lower than the first refractive index. A width $d_i$ of an $i^{th}$ periodic structure of refractive index in the periodic refraction structure unit is given by the equation $d_i = H_i \cdot (\lambda/(2 \cdot n_i)) + \lambda/(4 \cdot n_i)$, wherein $\lambda$ is an operating wavelength of the reflector, $n_i$ is a refractive index, $H_i$ expresses order, and i is a natural number.

In a second aspect of the present disclosure, the one or more high-refractive-index region is a region of the gain fiber onto which ultrashort pulse laser light is illuminated such that an irradiated portion of the gain fiber is given a higher refractive index, and the one or more low-refractive-index region is a region where the refractive index of the gain fiber has not been changed.

In a third aspect of the present disclosure, the gain fiber is a multi-mode optical fiber or a double-clad fiber.

A fourth aspect of the present disclosure is a fiber cavity wherein two of the reflectors of any one of the first to the third aspects are formed in the gain fiber, and light at the operating wavelength is reflected between the two reflectors so as to exhibit resonance.

A fifth aspect of the present disclosure is a fiber laser including a pump light source and the gain fiber and the fiber cavity of the fourth aspect. The pump light source generates excitation light. The gain fiber has a predetermined gain at the operating wavelength. In the fiber cavity, the periodic refraction structure units are formed in the gain fiber so as to be provided at both ends of the gain fiber. Excitation light from the pump light source is input through one of the reflectors, is imparted with gain in the gain fiber and resonates in the fiber cavity so as to be amplified, and light of wavelength $\lambda$ is output from the other of the reflectors as lasing light.

Aspects of the present disclosure provide a reflector, a fiber cavity, and a fiber laser for which reflected wavelength characteristics can be precisely set, that have high reliability, and that are able to accommodate shorter wavelengths.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments of the present disclosure, with reference to the drawings.

First Exemplary Embodiment

Figure 1A:
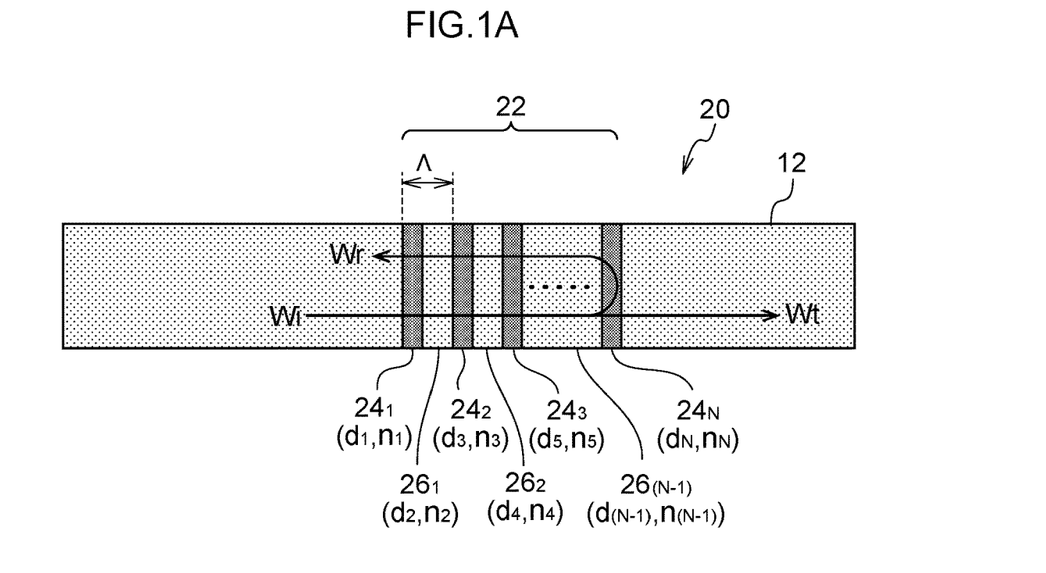
FIG. 1A is a cross-section view of a reflector according to a first exemplary embodiment.
Figure 1B:
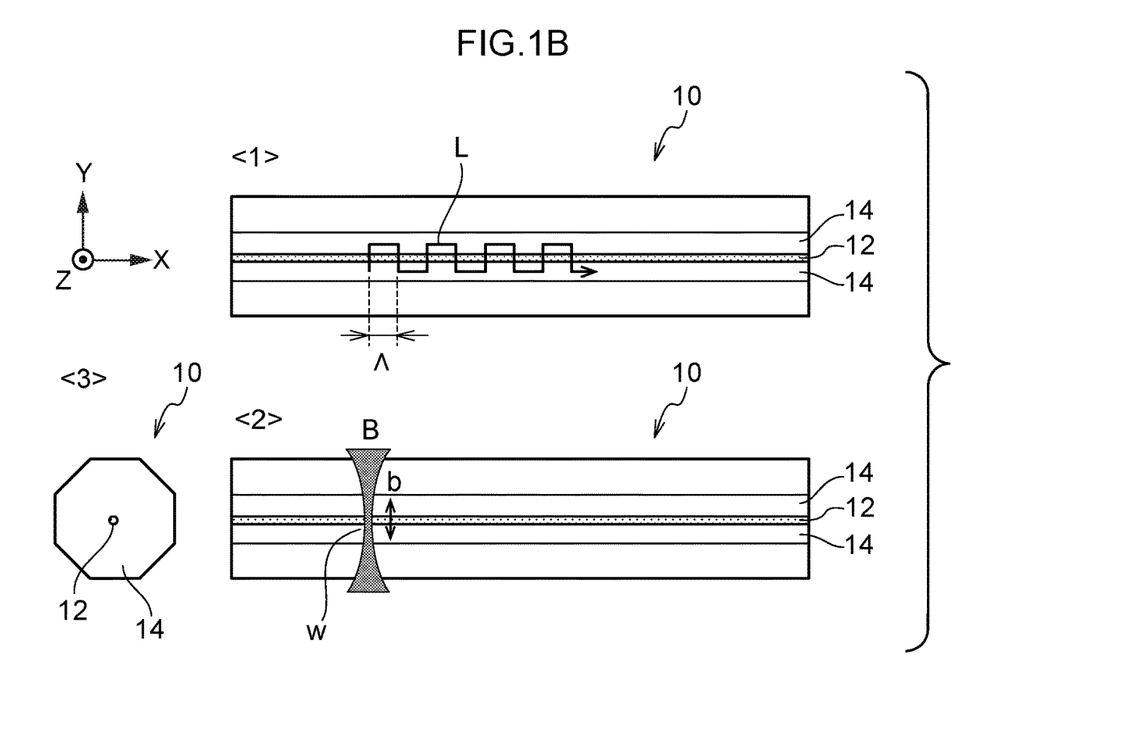
FIG. 1B depicts a plan view, a side view, and a cross-section view to explain a method of forming a HOFG.
Figure 2:
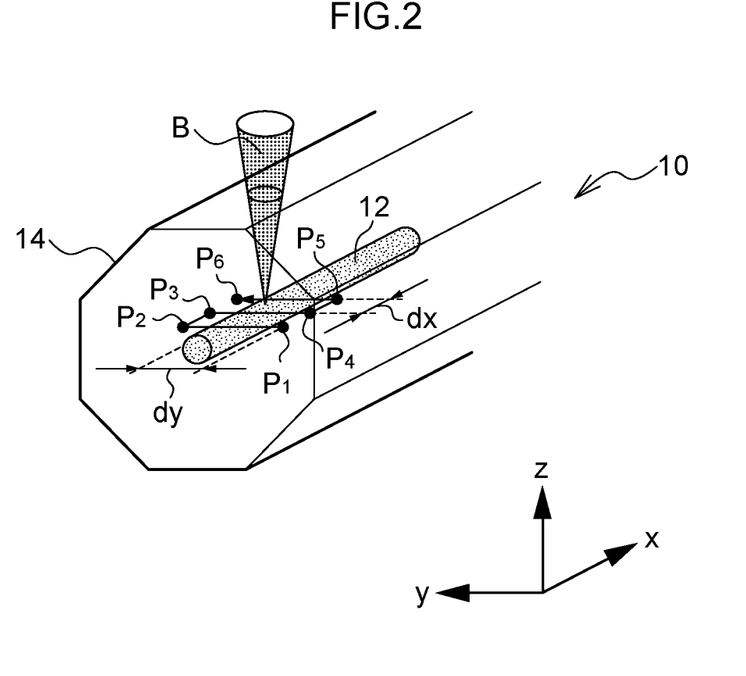
FIG. 2 is a diagram to explain processing for a reflector according to the first exemplary embodiment.

Explanation follows regarding a reflector according to a first exemplary embodiment, with reference to FIG. 1 and FIG. 2. FIG. 1A illustrates a cross-section view of a reflector according to a first exemplary embodiment, and FIG. 1B depicts a plan view, a side view, and a cross-section view to explain a method of forming a HOFG. FIG. 2 is a diagram to explain processing for a reflector according to the first exemplary embodiment;

As illustrated in FIG. 1A, a reflector 20 according to the present exemplary embodiment is configured including a periodic refraction structure unit 22 formed in a core 12 of an optical fiber 10, the periodic refraction structure unit 22 having periodic structures of refractive index. As illustrated in FIG. 2, a multi-mode double-clad fiber is employed as the optical fiber 10 in the present exemplary embodiment. Note that FIG. 1A only illustrates the core 12, and illustration of cladding is omitted therefrom.

As illustrated in FIG. 1B, the optical fiber 10 includes the core 12, first cladding 14 formed around the core 12, and non-illustrated second cladding formed around the first cladding 14. Hereafter, the first cladding 14 and the second cladding are referred to as cladding 16 when being referred to collectively. The refractive index of the core 12 is higher than the refractive index of the cladding 16. Light that enters the core 12 is thus transmitted along the extension direction of (the direction of the optical axis of) the optical fiber 10 while being totally reflected confined within the core 12.

Both the core 12 and the first cladding 14 are configured by an optically transparent base material such as quartz. The quartz in the core 12 is doped with a rare earth element. "Rare earth element" is a general term for scandium (Sc), yttrium (Y), and the fifteen lanthanoid elements. Elements such as ytterbium (Yb), erbium (Er), thulium (Tm), and neodymium (Nd) may be employed as optical fiber dopants. The rare earth element is added in an ionized state. Note that unlike germanium (Ge), rare earth elements are not added for the purpose of raising the refractive index of the core, and their mere addition has only a small raising effect on the refractive index of the core.

As illustrated in FIG. 1A, along the optical axis of the optical fiber 10 (the direction of light propagation), the periodic refraction structure unit 22 in the core 12 is periodically provided with high-refractive-index regions 24 ($24_1, 24_2, 24_3, \ldots, 24_N$) where the refractive index is higher than the core 12. In the periodic refraction structure unit 22, low-refractive-index regions 26 ($26_1, 26_2, \ldots, 26_{(N-1)}$) with the same refractive index as the core 12 and the high-refractive-index regions 24 with a higher refractive index than the core 12 are thus alternatingly arranged along the direction of the optical axis. In the present exemplary embodiment, both the high-refractive-index regions 24 and the low-refractive-index regions 26 are referred to as periodic refraction structures.

FIG. 1A depicts an example in which the high-refractive-index regions 24 are configured by an N-layer periodic structure of refractive index, and the low-refractive-index regions 26 are configured by an (N−1)-layer periodic structure of refractive index. Combinations ($d_i, n_i$) of the thicknesses $d_i$ and refractive indexes $n_i$ of the high-refractive-index regions $24_1, 24_2, 24_3, \ldots, 24_N$ are expressed by ($d_1, n_1$), ($d_3, n_3$), ($d_5, n_5$), $\ldots$, ($d_N, n_N$). Combinations ($d_i, n_i$) of the thicknesses $d_i$ and refractive indexes $n_i$ of the low-refractive-index regions $26_1, 26_2, \ldots, 26_{(N-1)}$ are expressed by ($d_2, n_2$), ($d_4, n_4$), $\ldots$, ($d_{(N-1)}, n_{(N-1)}$). The meaning of these combinations ($d_i, n_i$) of thicknesses $d_i$ and refractive indices $n_i$ is explained below.

The distance Λ illustrated in FIG. 1A indicates the period of a pair of one high-refractive-index region 24 and one low-refractive-index region 26. For example, $\Lambda = d_1 + d_2$. The periodic refraction structure unit 22 is a diffraction grating over which the refractive index of the core 12 is periodically varied along the optical axis direction of the optical fiber. Accordingly, a portion of an incident wave Wi that enters from the left side of the page is reflected by the periodic refraction structure unit 22 as a reflected wave Wr, and another portion is transmitted therethrough in the direction of travel of the incident wave Wi as a transmitted wave Wt.

In cases in which the optical fiber 10 is a multi-mode optical fiber such as in the present exemplary embodiment, since core diameter is generally larger than that of a single-mode optical fiber, it is difficult to form the high-refractive-index regions 24 across the entire cross-section of the core 12. For example, the core diameter of a multi-mode optical fiber may be approximately 50 μm, in contrast to a core diameter of approximately 5 μm to 10 μm for a single-mode optical fiber. However, if the high-refractive-index regions 24 are formed across only a portion of the cross-section of the core 12, the filtering characteristics and reflectivity of the periodic refraction structure unit 22 will be reduced by light leakage. In contrast thereto, since in the present exemplary embodiment the high-refractive-index regions 24 and the low-refractive-index regions 26 are formed across the entire cross-section of the core 12 as viewed in a cross-section taken orthogonally to the optical axis, such an issue is suppressed.

Optically transparent materials such as quartz generally do not absorb laser light, and thus are not able to be processed thereby. However, when ultrashort pulse laser light is illuminated thereon, due to the non-linear phenomenon known as multiphoton absorption, such optically transparent materials absorb light and are able to be processed. In the processing of the related art, ultrashort pulse laser light is illuminated on a workpiece at a high radiant energy density, reforming the workpiece by forming microcracks (voids) therein through ablation.

The inventors of the present disclosure have discovered that by employing, as the optically transparent material, an optical fiber that has a core doped with a rare earth element (the base material being quartz) and illuminating ultrashort pulse laser light on this core at a lower radiant energy density, the irradiated portion of the core is given a higher refractive index. Although ultrashort pulse laser light is also illuminated on the cladding surrounding the core, since the cladding is not doped with a rare earth element its refractive index is not increased. Further, no thermal changes in the optically transparent material or the rare earth element occur at the portion irradiated by ultrashort pulse laser light. Note that in the present disclosure, "ultrashort pulse laser light" refers to picosecond laser light with a pulse width of 10 picoseconds or less, or to femtosecond laser light.

Next, explanation follows regarding a method of manufacturing the reflector 20 (periodic refraction structure unit 22) according to the present exemplary embodiment, with reference to FIG. 1B. In FIG. 1B, <1> and <2> depict an irradiation path (scan path) for ultrashort pulse laser light as described above (hereafter referred to as "processing laser light"), wherein <1> is a plan view from above, and <2> is a side view from one side.

As illustrated in FIG. 1B <1>, the irradiation path L of processing laser light is a path over which the processing laser light is illuminated on the core 12 as it crosses the core 12 in a Y-axis direction and is moved along an X-axis direction at a pitch of Λ. When this occurs, as illustrated in FIG. 1B <2>, the position of a beam waist W, and the vicinity thereof (for example, a portion corresponding to the so-called Rayleigh length b), of a focused beam B of laser light is adjusted so as to be superimposed on the core 12. Namely, in the present exemplary embodiment, the focused beam B is illuminated over the entire cross-section the core 12 at plural positions along the optical axis direction of the optical fiber 10, increasing the refractive index at the irradiated portions, and thereby creating a periodic refraction structure unit 22 that includes periodic planar structures. The degree of change in refractive index when this is performed can be controlled by adjusting the power of the processing laser light.

Detailed explanation follows regarding a method of manufacturing the periodic refraction structure unit 22 according to the present exemplary embodiment, with reference to FIG. 2. FIG. 2 is a schematic diagram illustrating an example of a processing operation using a non-illustrated laser processing device that generates the processing laser light. In the following explanation, ultrashort pulse laser light is emitted plural times in succession. Note that as illustrated in FIG. 2, the processing process for the periodic refraction structure unit 22 is performed with the second cladding removed and the first cladding 14 exposed.

The non-illustrated laser processing device is configured including a light source that generates processing laser light, a stage on which the optical fiber 10 (workpiece) is placed, a drive unit that causes the light source and stage to move relative to one another, and a controller that controls the light source, the stage, and the drive unit. The controller causes collimated ultrashort pulse laser light to be output from the light source, and a focused beam B focused by a lens to be illuminated on the optical fiber 10 (workpiece).

While this happens, the controller uses the drive unit to move the stage relative to the focused beam B. Specifically, the stage is moved along a Z-axis direction such that the focal point (beam waist) of the focused beam B is positioned inside the core 12 of the optical fiber 10. The stage is also moved such that the focused beam B crosses the core 12 of the optical fiber 10 along the Y-axis direction at plural positions along the optical axis direction (X-axis direction) of the optical fiber 10.

As described above, FIG. 2 illustrates a state in which the focal point of the focused beam B of ultrashort pulse laser light is positioned inside the core 12 of the optical fiber 10. The focused beam B of ultrashort pulse laser light is first scanned a distance dy along the +Y direction from an origin position $P_1$ until a position $P_2$ is reached. Next, the focused beam B of ultrashort pulse laser light is scanned a distance dx along the +X direction from the position $P_2$ until a position $P_3$ is reached. Next, the focused beam B of ultrashort pulse laser light is scanned the distance dy along the −Y direction from the position $P_3$ until a position $P_4$ is reached. Next, the focused beam B of ultrashort pulse laser light is scanned the distance dx along the +X direction from the position $P_4$ until a position $P_5$ is reached. Next, the focused beam B of ultrashort pulse laser light is scanned the distance dy along the +Y direction from the position $P_5$ until a position $P_6$ is reached. Note that this is just one example of a method for scanning the focused beam B, and the focused beam B may be scanned in differing directions or in a different sequence.

The +X direction scan distance dx configures the grating period of the periodic refraction structure unit 22. The +Y direction and −Y direction scan distance dy is wider than the diameter of the core 12. Here, provided that the Rayleigh length b of the processing laser light is a length at least equal to the core diameter, ultrashort pulse laser light is illuminated across the entire cross-section of the core 12, increasing the refractive index of the core 12 along its entire cross-section. A periodic refraction structure unit 22 including the above-described periodic planar structures, namely the reflector 20, is thus produced. In this manner, the periodic refraction structure unit 22 according to the present exemplary embodiment differs greatly from the FBG according to Non-Patent Document 1 in that instead of being formed from discrete points, its periodic structure of refractive index is formed by planer and periodic structures.

Explanation follows regarding setting the period of a periodic refraction structure unit 22 according to the present exemplary embodiment. In a normal reflector (optical fiber formed with a FBG), taking the length of a high-refractive-index region along the optical axis direction as $d_1$ and the refractive index of this high-refractive-index region as $n_1$, and taking the length of a low-refractive-index region along the optical axis direction as $d_2$ and the refractive index of this low-refractive-index region as $n_2$, $d_1$ and $d_2$ are respectively set with lengths determined as $\lambda/(4n_1)$ and $\lambda/(4n_2)$. Note that $\lambda$, is the value of the operating wavelength in free space (in a vacuum). More specifically, when the operating wavelength $\lambda$ is, for example, 1 μm, $d_1=d_2\approx 0.2$ μm in a reflector made by exposure to interference for both single-mode fibers and multi-mode fibers, and thus the period $\Lambda(=d_1+d_2)$ is approximately 0.4 μm. However, it is very difficult to carry out processing at such a fine pitch using processing laser light.

Thus, in the periodic refraction structure unit 22 according to the present exemplary embodiment, higher-order fiber grating (HOFG) theory is used to set the period $\Lambda$. In this method of setting the period using HOFG, $H_i$ expresses the order, and $n_i$ and $d_i$ express the refractive index thickness of an $i^{th}$ layer. The thickness $d_i$ of each layer is calculated using the following equation (Equation (1)).

$$d_i = H_i \cdot (\lambda/(2 \cdot n_i)) + \lambda/(4 \cdot n_i) \tag{1}$$

wherein, $\lambda$ is the operating wavelength, and i=1, 2, 3, . . . (namely, i is a natural number).

In one example of Equation (1), when i=2, Equation (1) is expressed as Equation (2) below.

$$d_i = H_i \cdot (\lambda/(2 \cdot n_i)) + \lambda/(4 \cdot n_i) \tag{2}$$

wherein, i=1, 2.

Namely, the respective thickness of each periodic structure of refractive index is calculated using $$d_1 = H_1 \cdot (\lambda/(2 \cdot n_1)) + \lambda/(4 \cdot n_1) \text{ and}$$

$$d_2 = H_2 \cdot (\lambda/(2 \cdot n_2)) + \lambda/(4 \cdot n_2).$$

In this case, a period $\Lambda(=d_1+d_2)$ is expressed as in Equation (3) below.

$$\Lambda = H_1 \cdot (\lambda/(2 \cdot n_1)) + \lambda/(4 \cdot n_1) + H_2 \cdot (\lambda/(2 \cdot n_2)) + \lambda/(4 \cdot n_2) \tag{3}$$

For example, when the order $H_i$ is H=4 ($H_i$ being a fixed value), $d_i$ (i=1, 2) becomes:

$$d_i = 2.25\lambda/n_i = 1.664 \text{ μm} \tag{4}$$

The period $\Lambda(=d_1+d_2)$ also becomes:

$$\Lambda = 3.33 \text{ μm}.$$

Namely, the period $\Lambda$ is approximately eight times larger than in the above FBG where the period $\Lambda=0.4$ μm. With a period of such degree, femtosecond-order ultrashort pulse laser light can be focused on a core to make regions where the refractive index is changed. Note that $\lambda$ is the operating wavelength (the lasing wavelength of the laser), and since the present example uses a Yb-doped fiber, $\lambda$=approximately 1.07 μm to 1.08 μm. Note that $n_1$ is approximately 1.46.

For example, since $d_2=1.6655$ μm and $\Lambda=3.33$ μm when $\lambda=1.08$ μm and $n_2=1.4590$, $d_1=1.6645$ μm must be true, and in this case, it is sufficient that $n_1=1.4599$. Note that the present example is a numerical example in which the value of the base (optical fiber 10) refractive index $n_2$ is increased to $n_1$.

Note that although the foregoing was explained focusing on a case in which there are two periodic structures of refractive index (i=1, 2), the periodic structure of refractive index may be a third-order structure or greater.

Figure 3:
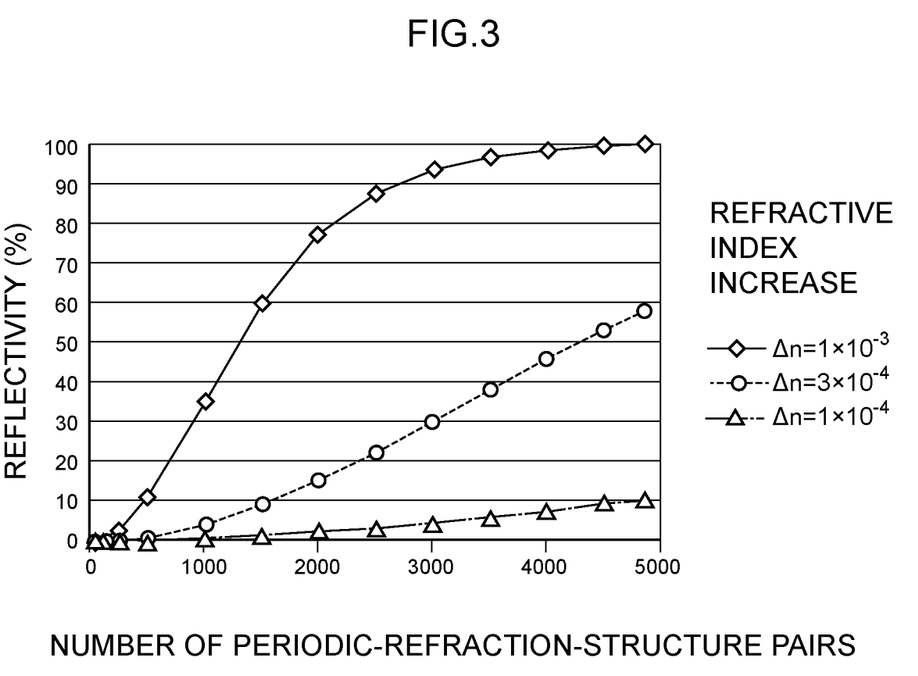
FIG. 3 is a graph illustrating the results of simulating the reflectivity of a reflector according to the first exemplary embodiment.

Explanation follows regarding actual measurements from a prototype reflector according to the present exemplary embodiment, and of simulated measurements, with reference to FIG. 3.

A periodic refraction structure unit with 1000 periodic structure of refractive index pairs was manufactured using ultrashort pulse laser light. The reflectivity of the periodic refraction structure unit was assessed to be 7.59% for an operating wavelength of 1.08 μm.

A numerical simulation based on HOFG theory was also carried out. These results are illustrated in FIG. 3. FIG. 3 is a graph illustrating relationships between the number of periodic structure of refractive index pairs in a periodic refraction structure unit and reflectivity for different refractive index increases (refractive index of high-refractive-index region—refractive index of low-refractive-index region) $\Delta n=(n_1-n_2)$. As illustrated in FIG. 3, when there are 1000 periodic structure of refractive index pairs, reflectivity is expected to be from 5% to 35% when the refractive index increase $\Delta n=|n_1-n_2|$ is set from $3\times10^{-4}$ to $1\times10^{-3}$. The above result of 7.59% reflectivity for 1000 pairs is thereby supported by theory.

More general description follows regarding periodic structure of refractive index. Note that "uniform period" indicates cases in which refractive indices $n_1$ and $n_2$ correspond to the thicknesses $d_1$ and $d_2$ of the respective regions.

However, implementations in which there are multiple values for refractive indices are also possible. For example, structures with refractive indices $n_1$, $n_2$, $n_3$ corresponding to thicknesses $d_1$, $d_2$, $d_3$, are also capable of broadening the reflected wavelength characteristics of the present exemplary embodiment or providing for sharper changes in the respective regions. Further, is it possible to realize a reflector with arbitrary reflected wavelength characteristics by considering entire regions to be single periods and implementing structures in which such combinations of regions $(d_i, n_i)$ (for i=1, 2, 3, . . . ) are considered to be single periods.

Second Exemplary Embodiment

Figure 4A:
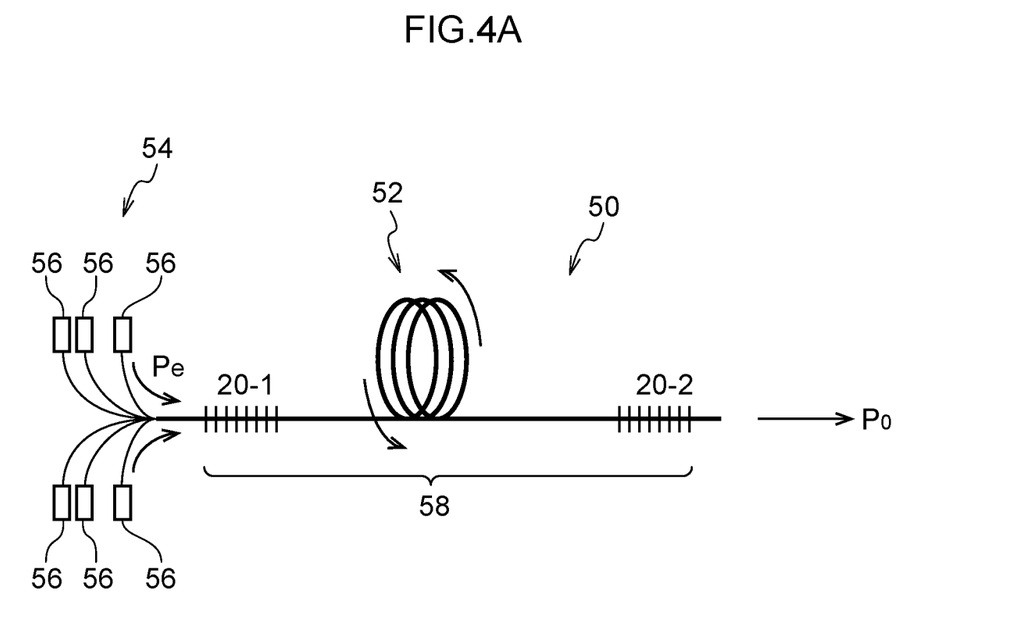
FIG. 4A is a schematic diagram illustrating an example configuration of a fiber laser according to a second exemplary embodiment.
Figure 4B:
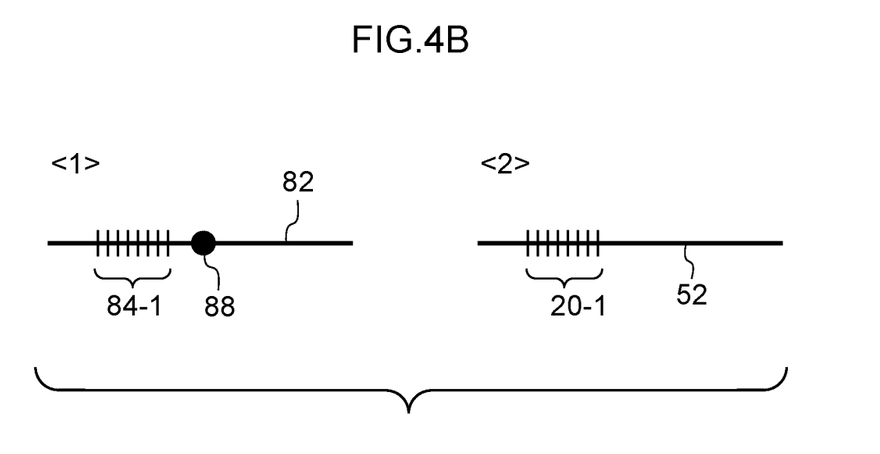
FIG. 4B is a diagram to explain the difference between a reflector of a fiber laser according to the second exemplary embodiment and a reflector of a fiber laser according to a comparative example.

Explanation follows regarding a fiber laser 50 and a fiber cavity 58 according to a second exemplary embodiment, with reference to FIG. 4A and FIG. 4B. FIG. 4A is a schematic diagram illustrating an example configuration of the fiber laser 50 and the fiber cavity 58 according to the present exemplary embodiment, and FIG. 4B is a diagram to explain the difference between a reflector of a fiber laser according to the present exemplary embodiment and a reflector of a fiber laser according to a comparative example.

As illustrated in FIG. 4A, the fiber laser 50 according to the present exemplary embodiment is configured including an active fiber 52, reflectors 20-1, 20-2 (referred to collectively as reflectors 20), and a light source 54 including plural (six, in the example illustrated in FIG. 4A) semiconductor lasers 56.

The active fiber 52 is a portion that provides optical gain in a laser oscillator. In the present exemplary embodiment, a rare-earth-doped optical fiber that has a core doped with a rare earth element is employed as the active fiber 52. Since the fiber laser 50 according to the present exemplary embodiment is a high-output fiber laser, a multi-mode optical fiber is used for the optical fiber that serves as the base of the active fiber. Namely, in the present exemplary embodiment, a multi-mode optical fiber with a $Yb^{3+}$-doped core is employed as an example of the active fiber 52.

Light from the plural semiconductor lasers 56 is combined by a non-illustrated combiner and is input to the reflector 20-1 as pump light Pe with a wavelength λe.

The reflectors 20-1, 20-2 are reflectors that include a periodic refraction structure unit 22 as in the exemplary embodiment described above. The wavelength characteristics of the reflector 20-1 are set such that reflector 20-1 transmits wavelength-λe pump light Pe and reflects light at the lasing wavelength k of the fiber laser 50. The wavelength characteristics of the reflector 20-2 are set such that reflector 20-1 reflects a portion of light (for example, approximately 10%) at the lasing wavelength and transmits another portion (for example, 90%). The reflectors 20-1, 20-2 and the fiber that connects the reflectors 20-1, 20-2 together configure the fiber cavity 58 of the present exemplary embodiment.

Explanation follows regarding the basic operation of the fiber laser 50. First, wavelength-λe pump light is output from the plural semiconductor lasers 56. The non-illustrated combiner combines the pump light output from each of the semiconductor lasers 56, and the combined light is output to the active fiber 52. $Yb^{3+}$ in the core of the active fiber 52 is excited by the pump light, thereby generating light in the wavelength band of from 1030 nm to 1100 nm. The generated light is amplified by the optical amplification effect of the active fiber 52 and the effect of the fiber cavity 58 configured by the reflector 20-1 and the reflector 20-2, resulting in lasing. Generated laser light is output as output light Po.

More detailed explanation follows regarding the features of the fiber cavity 58 and the fiber laser 50 of the present exemplary embodiment, with reference to FIG. 4B. In FIG. 4B, <1> illustrates the area around the reflector 84-1 of the fiber laser 80 (see FIG. 5) according to the comparative example, and <2> illustrates the area around the reflector 20-1 of the fiber laser 50.

As illustrated in FIG. 4B <1>, the fiber laser 80 includes a splice section 88 where the active fiber 82 and the reflector 84-1 are connected in the vicinity of the reflector 84-1. As mentioned above, light leakage and loss at this splice section 88, or melting or ignition of the optical fiber caused by such light leakage, are concerns. If there is at point of loss such as the splice section 88 in an optical cavity, the lasing threshold may rise and slope efficiency may be reduced. Moreover, if the wavelength of pump light or laser output light is reduced, there is concern that fluctuation in the refractive index of a FBG produced using a $GeO_2$-doped fiber may occur as a result of the shorter wavelength light.

In contrast thereto, in the fiber cavity 58 and the fiber laser 50 of the present exemplary embodiment, as illustrated in FIG. 4B <2>, the optical fiber configuring the active fiber 52 and the optical fiber configuring the reflector 20-1 (20-2) are configured by a common optical fiber, resulting in a configuration in which the issues mentioned above are not able to occur.

The effects of the reflector, fiber cavity, and fiber laser of the present exemplary embodiment described in detail above can be summarized as follows.

(1) Having no fused points (splice sections) within the fiber cavity allows for a more reliable fiber cavity.

Namely, in the fiber laser (fiber laser 80) according to the related art, the active fiber (gain fiber) and the fiber cavity are implemented by separate fibers that are fused together. A small amount radiation is emitted from such a fused point. Damage originating due to such radiation at a fused point is liable to occur in a high-output fiber laser. In the reflector, fiber cavity, and fiber laser according to the present exemplary embodiment there are no such fused points, and so a similar issue does not occur.

(2) A reflector, fiber cavity, and fiber laser able to accommodate the trend toward shorter wavelengths can be provided.

Namely, in the reflector of the fiber cavity according to the related art, $GeO_2$ doping endowed an increased sensitivity to ultraviolet light, making the refractive index liable to change. Although not an issue for reflectors employed in fiber lasers that lase in the 1.0 μm to 1.5 μm band in response to near-infrared band (800 nm to 980 nm) pump light, there is concern that in the future, in short wavelength fiber lasers that lase using pump light in the 400 nm band, for example, a change in the refractive index of a reflector may be induced by pump light or lasing light and result in self-inflicted damage. There is no such concern with reflectors in which a higher refractive index is induced in a manner like for the reflector of the present exemplary embodiments. Moreover, since reflectors in a short wavelength lasers have short periods, interference presents difficulties in manufacture. In this respect as well, the manufacture of reflectors employing the HOFG process according to the present exemplary embodiments is advantageous.

(3) Arbitrary reflected wavelength characteristics can be realized.

Namely, in the reflector according to the related art, an interference pattern produced using ultraviolet light and a phase shift mask is used to assign refractive index. In contrast thereto, in a reflector employing the HOFG process according to the present exemplary embodiment, the thickness $d_1$ of each region with a refractive index $n_1$ is able to be directly controlled such that arbitrary reflection characteristics can be realized.

Note that although each of the above exemplary embodiments was explained using an example in which the optical device manufactured using an HOFG process is a reflector (diffraction grating), there is no limitation thereto. For example, application may be made to a wavelength-selective filter, a wavelength-selective mirror, a gain equalizer, etc.

What is claimed is:

1. A reflector comprising:
    a gain fiber that has a core doped with a rare earth element;
    a high-refractive-index that is a portion of the core with a uniform high refractive index, the high-refractive-index region having a predetermined width, is formed at a predetermined spacing along an optical axis direction of the gain fiber, and is formed across an entire section of the core that is orthogonal to the optical axis of the core; and
    a low-refractive-index region that is a portion of the core with a uniform low refractive index that is lower than the uniform high refractive index, the low-refractive-index region being formed adjacent to the high-refractive-index region, and having a width equal to the predetermined spacing,
    wherein a width $d_i$ of each of the high-refractive-index region and the low-refractive-index region is defined by the equation $d_i = H_i \cdot (\lambda/(2 \cdot n_i)) + \lambda/(4 \cdot n_i)$, in which $\lambda$ is an operating wavelength of the reflector, $n_i$ is a uniform refractive index of the high-refractive-index region or low-refractive-index region, $H_i$ is a natural number that expresses order, and i is a natural number.

2. The reflector of claim 1, wherein the high-refractive-index region is a region of the gain fiber onto which ultrashort pulse laser light is illuminated such that an irradiated portion of the gain fiber is given the uniform high refractive index, and the low-refractive-index region is a region where a refractive index of the gain fiber has not been changed.

3. The reflector of claim 1, wherein the gain fiber is a multi-mode optical fiber or a double-clad fiber.

4. A fiber cavity wherein two of the reflectors of claim 1 are formed in the gain fiber, and light at the operating wavelength is reflected between the two reflectors so as to exhibit resonance.

5. A fiber laser comprising:
    a pump light source that generates excitation light;
    the gain fiber having a predetermined gain at the operating wavelength; and
    the fiber cavity of claim 4, the periodic refraction structure units being formed in the gain fiber so as to be provided at both ends of the gain fiber,
    wherein the excitation light from the pump light source is input through one of the reflectors, is imparted with gain in the gain fiber and resonates in the fiber cavity so as to be amplified, and light of wavelength $\lambda$, is output from the other of the reflectors as lasing light.

* * * * *